United States Patent
Misawa

(10) Patent No.: US 8,004,599 B2
(45) Date of Patent: Aug. 23, 2011

(54) AUTOMATIC FOCUS ADJUSTING APPARATUS AND AUTOMATIC FOCUS ADJUSTING METHOD, AND IMAGE PICKUP APPARATUS AND IMAGE PICKUP METHOD

(75) Inventor: Takeshi Misawa, Miyagi (JP)

(73) Assignee: FujiFilm Corporation, Tokyo (JP)

( * ) Notice: Subject to any disclaimer, the term of this patent is extended or adjusted under 35 U.S.C. 154(b) by 469 days.

(21) Appl. No.: 12/121,450

(22) Filed: May 15, 2008

(65) Prior Publication Data
US 2008/0284901 A1 Nov. 20, 2008

(30) Foreign Application Priority Data
May 18, 2007 (JP) .................................. 2007-133129

(51) Int. Cl.
*H04N 5/232* (2006.01)
(52) U.S. Cl. ........................................ 348/349; 348/345
(58) Field of Classification Search .................. 348/350; 396/123
See application file for complete search history.

(56) References Cited

U.S. PATENT DOCUMENTS

| | | | | |
|---|---|---|---|---|
| 6,931,208 B2 * | 8/2005 | Nakata et al. ................. | 396/123 |
| 7,298,412 B2 * | 11/2007 | Sannoh et al. ................ | 348/348 |
| 7,676,149 B2 * | 3/2010 | Wu et al. ...................... | 396/234 |
| 7,750,970 B2 * | 7/2010 | Ide et al. ...................... | 348/345 |
| 2004/0207743 A1 | 10/2004 | Nozaki et al. | |
| 2004/0208114 A1 | 10/2004 | Lao et al. | |
| 2007/0047941 A1 | 3/2007 | Iwane et al. | |
| 2008/0007634 A1 * | 1/2008 | Nonaka et al. ................ | 348/234 |

FOREIGN PATENT DOCUMENTS

| | | |
|---|---|---|
| EP | 1 471 455 A2 | 10/2004 |
| JP | 2001-141981 A | 5/2001 |
| JP | 2004-222118 A | 8/2004 |
| JP | 2004-317699 A | 11/2004 |
| JP | 2006-340000 A | 12/2006 |
| JP | 2007-065290 A | 3/2007 |
| JP | 2007-67934 A | 3/2007 |
| WO | WO 2006/129777 A1 | 12/2006 |

* cited by examiner

*Primary Examiner* — Luong T Nguyen
(74) *Attorney, Agent, or Firm* — Birch, Stewart, Kolasch & Birch, LLP

(57) ABSTRACT

In an automatic focus adjusting method for adjusting the focus based on image signals in a preset focus detection area, the face is detected from an image, and the detected face area is set as the focus detection area in a front-light scene. On the other hand, when a backlight scene is identified, an area in which the detected face area is reduced is set as the focus detection area. This enables to control the focus so that the face is accurately focused on without being affected by the contrast of the contour of the face in a backlight scene (contrast of the contour of the face is strong in the backlight scene).

12 Claims, 17 Drawing Sheets

AUTOMATIC FOCUS ADJUSTING APPARATUS AND AUTOMATIC FOCUS ADJUSTING METHOD, AND IMAGE PICKUP APPARATUS AND IMAGE PICKUP METHOD

BACKGROUND OF THE INVENTION

1. Field of the Invention

The present invention relates to an automatic focus adjusting apparatus and an automatic focus adjusting method, and an image pickup apparatus and an image pickup method, and particularly to a technology for focusing the face.

2. Description of the Related Art

Conventionally, a digital camera which adjusts a focus based on image signals of a focus detection area (AF area) in an image has been proposed, in which the face of a person is identified from the image and the area of the face is set as the AF area when the size of the identified face is greater than a predetermined value, thereby setting an optimal AF area depending on the size of the face (Japanese Patent Application Laid-Open No. 2004-317699).

The digital camera described in Japanese Patent Application Laid-Open No. 2004-317699 further identifies eyes within the face and sets a predetermined area, which is narrower than the face area and includes the identified eyes therein, as the AF area when determining that the size of the face is greater than the predetermined value.

SUMMARY OF THE INVENTION

FIG. 16 is a view of a photograph of a person. According to a related art, when a face is detected from an image in an imaging range as shown in FIG. 16, a predetermined face area including the face is set as a focus detection area as shown with a frame border F in FIG. 16, and contrast AF for adjusting a focus is performed so that the contrast of the image signals in the focus detection area becomes maximum.

Here, when a photograph of a person is taken against the sun, the image (face image) in the focus detection area exhibits strong contrast in a contour of a face image due to the backlight. FIG. 17 depicts the person in the focus detection area of FIG. 16 as seen from the top of the head. As shown in FIG. 17, the contrast of the contour of the face image shown with arrows A and B in FIG. 17 exhibits strong contrast in the backlight scene.

I, the inventor of the present invention, found a problem that when performing contrast AF for adjusting a focus so that a contrast of an image signals in a focus detection area becomes maximum using the related art, an edge of hair or an ear having strong contrast as shown FIG. 17 is focused on if a photograph of a person is taken against the sun, thereby adjusting the focus on a point behind the desired focus point (rear focus).

The present invention has been made in view of the foregoing, and the object thereof is to provide an automatic focus adjusting apparatus and an automatic focus adjusting method, and an image pickup apparatus and an image pickup method capable of accurately focusing on a face without being affected by a contour of the face even when the face is detected in a backlight scene.

In order to attain the object, according to a first aspect of the present invention, an automatic focus adjusting apparatus which adjusts the focus based on image signals in a preset focus detection area, the automatic focus adjusting apparatus comprises: an image acquisition device which acquires an image; a face detection device which detects a face from the image acquired by the image acquisition device; a backlight detection device which detects backlight based on the image acquired by the image acquisition device; and a focus detection area setting device which sets, when a face is detected by the face detection device, a first face area including the face detected by the face detection device as a focus detection area if backlight is not detected by the backlight detection device and a second face area in the first face area narrower than the first face area as the focus detection area if backlight is detected by the backlight detection device.

Therefore, when the face is detected in a backlight scene, the second face area narrower than the first face area including the face is set as the focus detection area, thereby enabling to control the focus without being affected by the contrast of the contour of the face (contrast of the contour of the face is strong in the backlight scene) and to accurately focus on the face. Since the contrast of the face itself is not so strong, it is more preferable to set the focus detection area so that the contour of the face falls within the focus detection area rather than to narrow down the focus detection area from the beginning when the contour of the face is not backlit.

According to a second aspect of the present invention, in the automatic focus adjusting apparatus according to the first aspect, the face detection device includes a contour detection device which detects a contour of the face, and the focus detection area setting device calculates the second face area so that the second face area falls within the contour of the face detected by the contour detection device when calculating the second face area in the first face area narrower than the first face area after the backlight is detected by the backlight detection device.

Thus, the second face area is calculated so as to fall within the contour of the face when the face is detected in the backlight scene and the second face area in the first face area, which is narrower than the first face area, is to be calculated. This enables to more reliably control the focus without being affected by the contrast of the contour of the face.

According to a third aspect of the present invention, in the automatic focus adjusting apparatus according to the first aspect, the face detection device includes a face direction detection device which detects a direction of the face, and the focus detection area setting device calculates the second face area by reducing larger on the deeper side of the first face area than on the front side, depending on the direction of the face detected by the face direction detection device when calculating the second face area in the first face area narrower than the first face area after the backlight is detected by the backlight detection device.

The direction of the face may be to the side or diagonal, instead of to the front. The contour of the face falls within the area corresponding to the deeper side of the face in the first face area when the direction of the face is to the side or diagonal, because the face area (first face area) is set such that face components (for example, eyes, a nose, and a mouth) on the front side of the face fall within the area. Thus, the second face area is calculated by reducing larger on the deeper side of the first face area than on the front side, is calculated depending on the direction of the face so as to avoid the contour of the face from falling within the second face area and enable to focus on near the center of the face. Only the area on the deeper side of the first face area may be reduced depending on the direction of the face, or both of the area on the deeper side and the area on the front side may be reduced with different reduction ratios.

According to a fourth aspect of the present invention, in the automatic focus adjusting apparatus according to the first aspect, the face detection device includes a face component detection device which detects face components including eyes and a face direction detection device which detects a direction of the face, and the focus detection area setting device identifies an eye on the front side of the eyes detected by the face component detection device depending on the direction of the face detected by the face direction detection device and calculates the second face area obtained by reducing the first face area so as to include the identified eye on the front side, when calculating the second face area in the first face area narrower than the first face area after the backlight is detected by the backlight detection device.

Since the contour of the face falls within the area corresponding to the deeper side of the face of the first face area when the direction of the face is to the side or diagonal, the second face area is calculated by reducing the first face area so as to include the eye on the front side (reducing the area including the eye on the deeper side), thereby avoiding the contour of the face from falling within the second face area and enabling to focus on near the eye on the front side of the face.

According to a fifth aspect of the present invention, in the automatic focus adjusting apparatus according to the first aspect, the face detection device includes a face component detection device which detects face components including eyes and a mouth and a face direction detection device which detects a direction of the face, a face direction detection device which detects a direction of the face, and the focus detection area setting device identifies an eye and an edge of the mouth on the front side of the eyes and edges of the mouth detected by the face component detection device depending on the direction of the face detected by the face direction detection device and calculates the second face area obtained by reducing the first face area so as to include the identified eye on the front side and the edge of the mouth on the front side, when calculating the second face area in the first face area narrower than the first face area after the backlight is detected by the backlight detection device.

Since the contour of the face falls within the area corresponding to the deeper side of the face in the first face area when the direction of the face is to the side or diagonal, the second face area which is calculated by reducing the first area so as to include the eye on the front side and the edge of the mouth on the front side, thereby avoiding the contour of the face from falling within the second face area and enabling to focus on near the eye on the front side and the edge of the mouth on the front side.

According to a sixth aspect of the present invention, in the automatic focus adjusting apparatus according to any of the aspects 1 to 5, the backlight detection device includes a first backlight detection device which detects backlight based on the entire image acquired by the image acquisition device and a second backlight detection device which detects backlight based on an image in the first face area including the face detected by the face detection device, and when the face is detected by the face detection device, the first face area including the face detected by the face detection device is set as the focus detection area if the backlight is not detected by the first backlight detection device or the second backlight detection device, and the second face area in which the first face area is reduced is set as the focus detection area if the backlight is detected by the first backlight detection device and the second backlight detecting device.

The face area (first face area) including the face may not be backlit even if the image is detected as a backlight scene when, for example, a tree or the like exists behind the person. Therefore, when the image is detected as a backlight scene, whether the image in the first face area including the face is backlit is further detected, and the second face area narrower than the first face area is set as the focus detection area only when the image in the first face area is backlit, thereby controlling the focus without being affected by the contrast of the contour of the face.

According to a seventh aspect of the present invention, an image pickup apparatus comprising: the automatic focus adjusting apparatus according to any of the aspects 1 to 6; an image pickup device which picks up an image in which the focus is adjusted by the automatic focus adjusting apparatus; and a recording device which records the picked up image on a recording medium.

Thereby, an image can be picked up by focusing on the face without being affected by the contrast of the contour of the face even when the face is detected in the backlight scene.

According to an eighth aspect of the present invention, an automatic focus adjusting method comprising: an image acquisition step of acquiring an image; a face detection step of detecting a face from the acquired image; a backlight detection step of detecting backlight based on the acquired image; detection step, a focus detection area setting step of, when a face is detected in the face, setting a first face area including the detected face as a focus detection area when backlight is not detected in the backlight detection step and setting a second face area in the first face area narrower than the first face area including the detected face as the focus detection area when backlight is detected; and a step of adjusting a focus based on image signals in the focus detection area set in the focus detection area setting step.

According to a ninth aspect of the present invention, in the automatic focus adjusting method according to the eighth aspect, the face detection step includes a contour detection step of detecting a contour of the face, and in the focus detection area setting step, the second face area is calculated so that the second face area falls within the contour of the face detected in the contour detection step when calculating the second face area in the first face area narrower than the first face area after the backlight is detected in the backlight detection step.

According to a tenth aspect of the present invention, in the automatic focus adjusting method according to the eighth aspect, wherein the face detection step includes a face direction detection step of detecting a direction of the face, and in the focus detection area setting step, the second face area is calculated by reducing larger on the deeper side of the first face area than on the front side, depending on the direction of the face detected in the face direction detection step when calculating the second face area in the first face area narrower than the first face area after the backlight is detected in the backlight detection step.

According to an eleventh aspect of the present invention, in the automatic focus adjusting method according to the eighth aspect, the face detection step includes a face component detection step of detecting face components including eyes and a face direction detection step of detecting a direction of the face, and in the focus detection area setting step, an eye on the front side of the eyes detected by the face component detection step is identified depending on the direction of the face detected in the face direction detection step and the second face area is calculated by reducing the first face area so as to include the identified eye on the front side, when calculating the second face area in the first face area narrower than the first face area after the backlight is detected in the backlight detection step.

According to a twelfth aspect of the present invention, in the automatic focus adjusting method according to the eighth aspect, the face detection step includes a face component detection step of detecting face components including eyes and a mouth and a face direction detection step of detecting the direction of the face, and in the focus detection area setting step, an eye on the front side of the eyes detected in the face component detection step and an edge of the mouth on the front side are identified depending on the direction of the face detected in the face direction detection step and the second face area is calculated by reducing the first face area so as to include the identified eye on the front side and the edge of the mouth on the front side, when calculating the second face area in the first face area narrower than the first face area after the backlight is detected in the backlight detection step.

According to a thirteenth aspect of the present invention, in the automatic focus adjusting method according to any of the eighth to twelfth aspects, the backlight detection step includes a first backlight detection step of detecting backlight based on the entire image acquired in the image acquisition step and a second backlight detection step of detecting backlight based on the image in the first face area including the face detected in the face detection step, and when a face is detected in the face detection step, the first face area including the face detected in the face detection step is set as the focus detection area if backlight is not detected in the first backlight detection step or the second backlight detection step, and the second face area obtained by reducing the first face area is set as the focus detection area if backlight is detected in the first backlight detection step and the second backlight detecting step.

According to a fourteenth aspect of the present invention, an image pickup method comprising: an image pickup step of picking up an image in which a focus is adjusted by the automatic focus adjusting method according to any of the eighth to thirteenth aspects; and a recording step of recording the picked up image on a recording medium.

According to the aspects the present invention, the face can be accurately focused on without being affected by the contour of the face even when the face is detected in the backlight scene.

DETAILED DESCRIPTION OF THE PREFERRED EMBODIMENTS

Preferred embodiments of an automatic focus adjusting apparatus and an automatic focus adjusting method, and an image pickup apparatus and an image pickup method according to the present invention will now be described with reference to the appended drawings.

[Image Pickup Apparatus]

Figure 1:
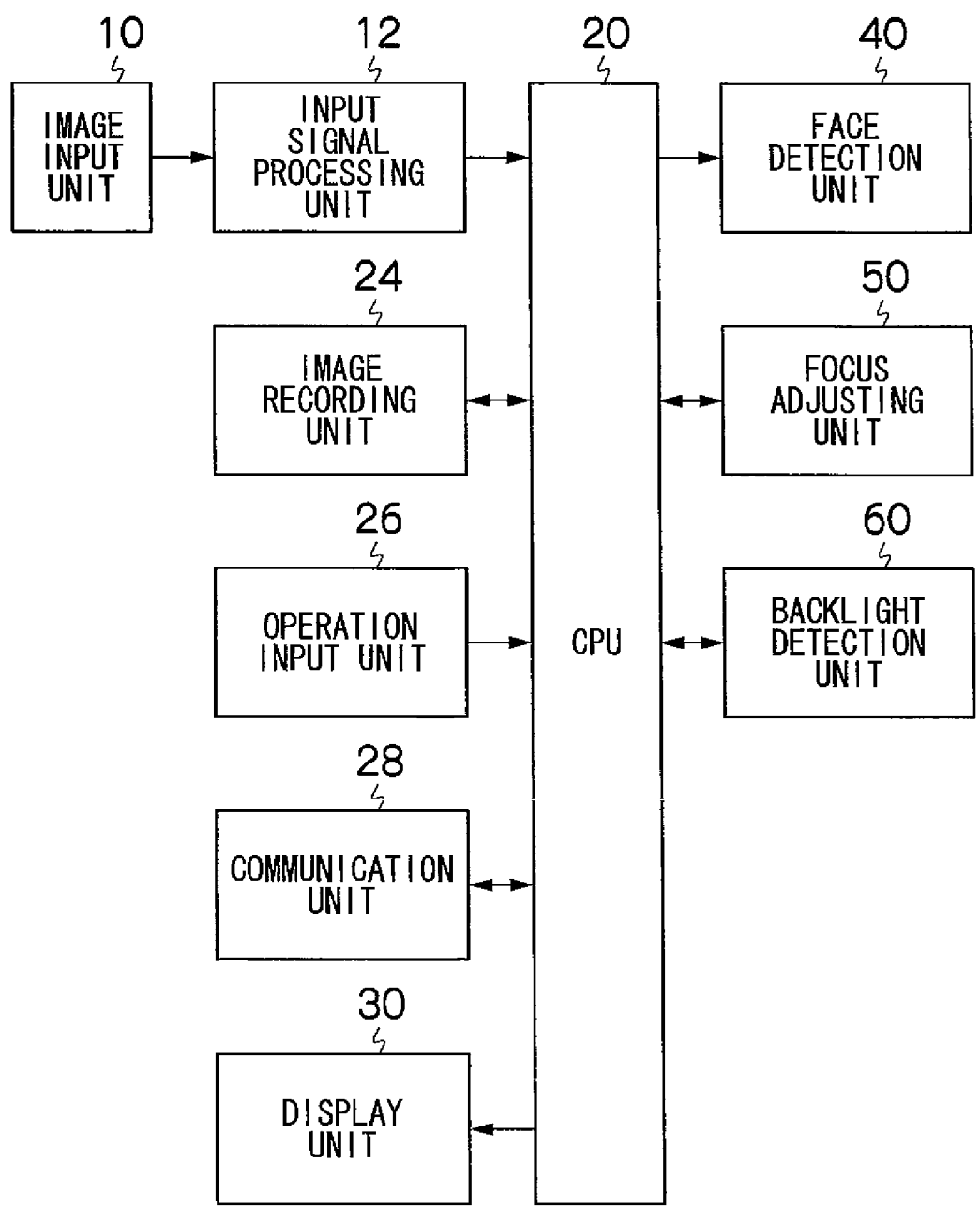
FIG. 1 is a block diagram showing an embodiment of an internal configuration of an image pickup apparatus comprising an automatic focus adjusting apparatus according to the present invention.

FIG. 1 is a block diagram showing an embodiment of an internal configuration of an image pickup apparatus comprising an automatic focus adjusting apparatus according to the present invention.

The image pickup apparatus shown in FIG. 1 comprises: an image input unit 10; an input signal processing unit 12; a central processing unit (CPU) 20; an image recording unit 24; an operation input unit 26; a communication unit 28; a display unit 30; a face detection unit 40; a focus adjusting unit 50; and a backlight detection unit 60.

The CPU 20 functions as a control device that administers and controls the entire image pickup apparatus in accordance with a predetermined program and controls each of the components based on an instruction by the operator from the operation input unit 26 or the communication unit 28.

When configured as an image pickup unit, the image input unit 10 uses lenses, an image pickup element, and the like to convert an optical image entering into the image input unit 10 from outside to image signals and outputs the image signals. The image input unit 10 may comprise, as necessary, an illumination unit such as a flash, an LED, or the like used as a fill light emitting unit when the light intensity is low. Furthermore, the image input unit 10 comprises an AE (automatic exposure adjusting) unit, an optical system control unit, an illumination control unit, and the like to control imaging.

The function of the image input unit 10 may overlap functions of the image recording unit 24 or the communication unit 28 when the image input unit 10 is configured as an external signal input unit which accepts image signals from outside. Specifically, an image is inputted using a recording medium interface of the image recording unit 24 or the communication unit 28. Additionally, although not shown, the image input unit 10 may comprise, as necessary, a fill light projecting unit which projects a fill light during photographing, a sound recording unit which records sound such as voice, ambient sounds, music or the like, a sound playback unit which plays back sound or the like and generates a warning beep, and so forth.

The input signal processing unit 12 processes and passes the image signals to the CPU 20. The signal process varies depending on the form of the output image signals requested by an operator. In accordance with the photographing mode, the image signals are subjected to an offset correction process, a gain correction process, a white balance correction process, a color matrix process, a gradation conversion process, a demosaic process, an edge enhancement process, a compression process, or the like. Examples of the photographing mode include a still image photographing mode and a moving image photographing mode. The still image photographing mode and the moving image photographing mode may further contain a plurality of photographing modes.

The image recording unit 24 records the inputted image signals. The medium for recording can be one of a built-in recording medium and an external recording medium represented by a memory card, or can be both. In addition, recording to an external recording medium is possible using a communication line. Not only the image signals, but also inputted or generated information (data) can be recorded. Although referred to as recording unit, the image recording unit 24 can not only record, but can also read, transmit the read out data to the communication unit 28 through the CPU 20, and display on the display unit 30.

The operation input unit 26 includes a power switch for operating the image pickup apparatus or an operation switch including a shutter switch. An operator can operate the image pickup apparatus by giving an instruction to the image pickup apparatus from the operation input unit 26.

The communication unit 28 is a device for the image pickup apparatus to communicate with the outside. A communication method such as cable communication, wireless communication, or optical communication can be used as necessary. A communication protocol can also be selected as necessary. The communication unit 28 can transmit information to the outside as well as to receive information from the outside.

The face detection unit 40 detects features of a subject such as head, face, eyes, pupils, nose, mouse, and sun glasses from image signals inputted from the image input unit 10 or from image signals recorded in the image recording unit 24. The face detection unit 40 then detects a face by identifying feature points and patterns. Known methods can be used as a method for the face detection, such as a face detection method by detecting edges or geometric patterns, a feature point vector approximation method by vectorizing feature points which are coordinates of features, and approximating and detecting the feature point vectors, and an area detection method by detecting hue or skin color.

Once detecting the face, the face detection unit 40 outputs information indicative of the area of the face (face area) to the CPU 20. The information of the face area can obviously used for white balance correction, as well as for AE, AF, recording, display, and the like.

The backlight detection unit 60 detects backlight from the inputted image signals. The backlight is detected from the image signals and is identified by comprehensive use of information of the AE unit, information of the white balance processing unit, and other information (partial white balance may be used as the white balance). In the AE detection unit, for example, one screen is divided into 64 AE blocks (eight by eight), an integrated average value (luminance value) of the image signals (G signals or luminance signals) is calculated for each AE block, the luminance value subjected to split photometry is weighted and added in accordance with the photometric method (center-weighted metering, averaging metering, or spot metering of a face area or the like), and the subject luminance (EV value) is calculated based on the value weighted and added. The backlight detection unit 60 determines the backlight under the conditions that the EV value is the one that indicates outdoors based on the information from the AE detection unit, a main subject is located near the center, an AE block which is brighter than the main subject by 5 EV or more exists around the main subject, or other conditions. However, the backlight determination device is not the main point of the present invention, and other methods can also be used.

The focus adjusting unit 50 adjusts a focus based on image signals in a standard focus detection area when a face is not detected, and adjusts a focus so that a face is focused on based on the image signals in the focus detection area corresponding to the face area when the face is detected. The detail is illustrated in FIG. 2.

First Embodiment

Figure 2:
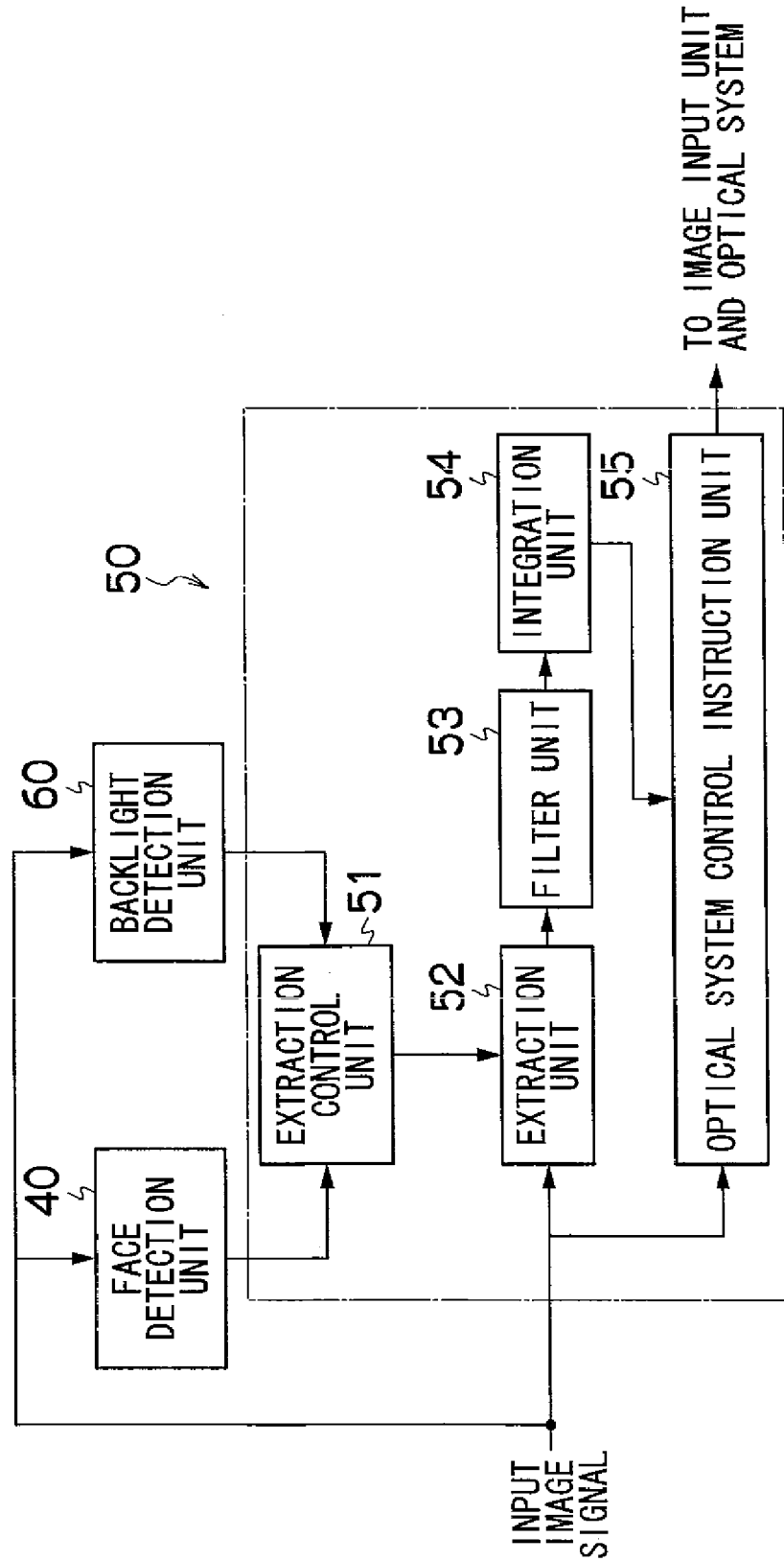
FIG. 2 is a block diagram showing a first embodiment of a focus adjusting unit.

FIG. 2 depicts a first embodiment of the focus adjusting unit 50. As shown in FIG. 2, the focus adjusting unit 50 comprises: an extraction control unit 51; an extraction unit 52; a filter unit 53; an integration unit 54; and an optical system control instruction unit 55.

The extraction unit 52 extracts image signals in the focus detection area from the inputted image signals. The extracted image signals are added to the filter unit 53 such as a low pass filter and a band pass filter, and high frequency components are extracted at this point. The extracted high frequency components are integrated by the integration unit 54 and calculated as a focus evaluation value. Using the calculated focus evaluation value and other information obtained from the input image signals (such as brightness and motion), the optical system control instruction unit 55 controls the focus of the optical system in the image input unit 10.

More specifically, the optical system (focus lenses) is sequentially moved to the lens positions corresponding to positions from the closest point to the infinity, high frequency components included in the image signals within the focus detection area among the image signals inputted in each lens position are extracted and integrated, the lens position where the integral value (focus evaluation value) is at its peak is defined as a focus position, and the optical system is moved to the lens position. However, the position of the imaging element may be controlled instead of the optical system depending on the configuration. When shooting moving images or the like, the focus is adjusted by a so-called hill climbing method controlling so as to always maintain the focus evaluation value at its peak.

The extraction control unit 51 controls the extraction unit 52. Information on the face area from the face detection unit 40 and backlight information from the backlight detection unit 60 are inputted to the extraction control unit 51. When a face is not detected based on the information, the extraction control unit 51 sets a standard focus detection area (a predetermined area at the center of the screen) and instructs the extraction unit 52 to extract image signals in the focus detection area. When a face is detected and a front-light scene is identified, the extraction control unit 51 sets a face area (first face area) including the face detected by the face detection unit 40 as a focus detection area and instructs the extraction unit 52 to extract image signals in the focus detection area.

On the other hand, the extraction control unit 51 sets a face area (second face area), which is obtained by reducing the first face area, as a focus detection area and instructs the extraction unit 52 to extract image signals in the focus detection area when a face is detected and a backlight scene is identified.

Figure 3:
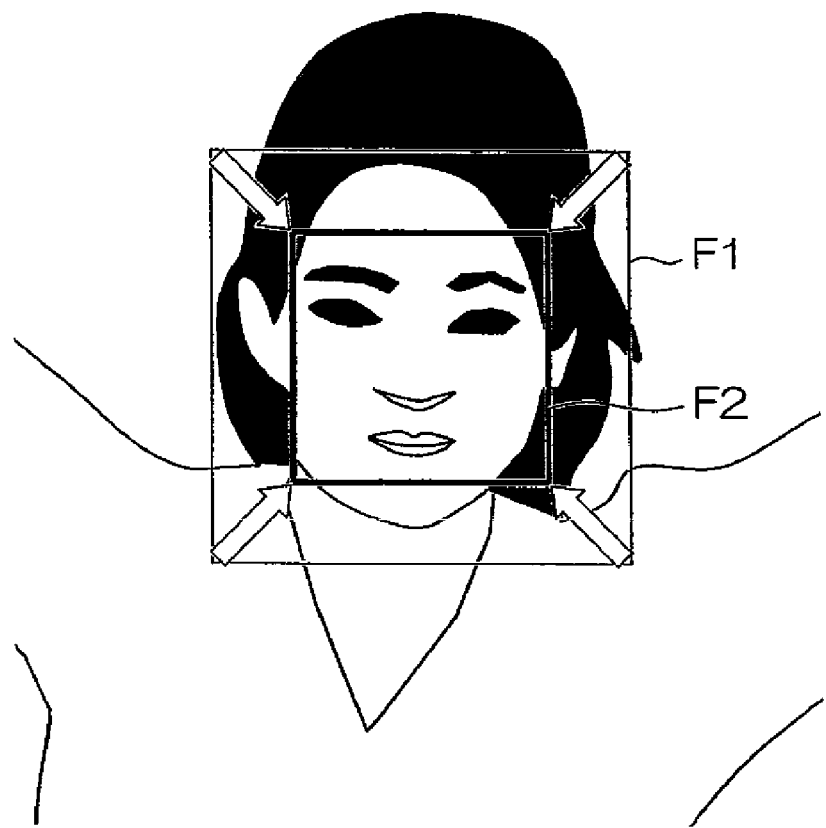
FIG. 3 is a view used for describing focus detection areas when a face is detected.

FIG. 3 depicts the focus detection areas thus established. A frame border F1 denotes the first face area set as the focus detection area, while a frame border F2 denotes the second face area set as the focus detection area.

Photographing in the image pickup apparatus is usually started with a shutter button constituted as part of the operation input unit 26. In still image shooting, one still image is photographed as the shutter button is pressed down. In continuous shooting, still images are continuously photographed while the shutter button is pressed down (during ON). In moving image shooting, shooting is usually started once the shutter button is pressed down, and the shooting is terminated as the shutter button is pressed down one more time.

Figure 4:
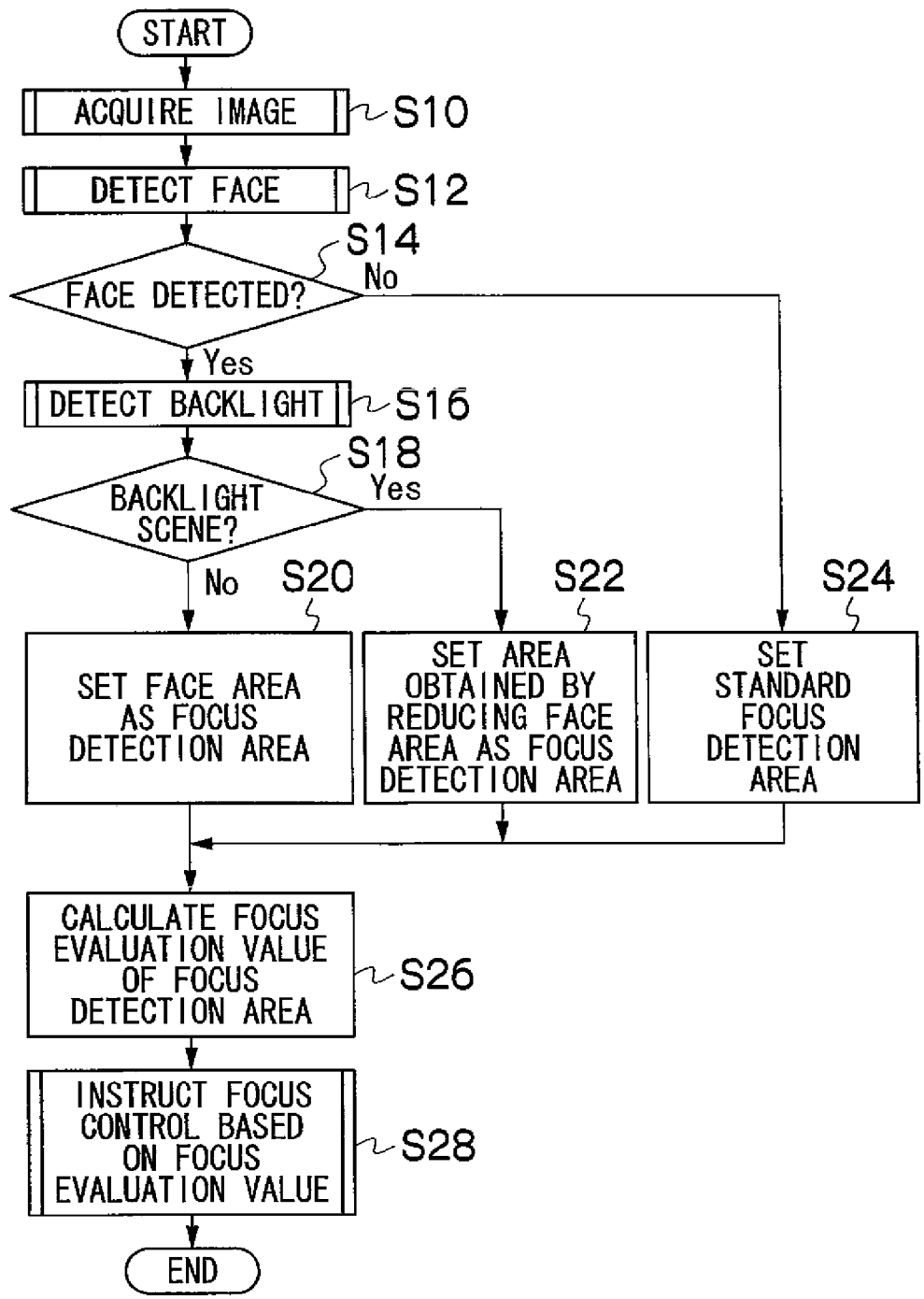
FIG. 4 is a flow chart showing a first embodiment of the automatic focus adjusting method according to the present invention.

A first embodiment of an automatic focus adjusting method according to the present invention will now be described with reference to a flow chart shown in FIG. 4.

Images are continuously acquired at a predetermined frame rate (for example, 60 frames/second or 30 frames/second) from the image input unit 10 (step S10). The face detection unit 40 detects a face based on the acquired images (step S12). Whether the face detection unit 40 has detected a face is then determined (step S14). The process shifts to step S16 when a face is detected, while the process shifts to step S24 when a face is not detected.

In step S16, the backlight detection unit 60 detects backlight of the input image. Whether the input image is in a backlight scene is determined based on information from the backlight detection unit 60 (step S18). The process shifts to step S20 when the backlight scene is not identified, while the process shifts to step S22 when the backlight scene is identified.

In step S20, since the face is detected and the front-light scene is identified, a face area (first face area) including the face detected by the face detection unit 40 is directly set as a focus detection area.

Meanwhile, in step S22, since the face is detected and the backlight scene is identified, a face area (second face area) which is obtained by reducing the first face area is set as a focus detection area.

In step S24, for example, a standard focus detection area at the center of the screen is set because a face is not detected.

Subsequently, image signals in the focus detection area thus established are extracted, and a focus evaluation value is calculated based on the extracted image signals (step S26). A lens position where the calculated focus evaluation value is at its peak is defined as a focus position, a focus control instruction for moving the optical system to the lens position is outputted, and a focus is adjusted by controlling the positions of the optical system (step S28).

In this way, when the backlight scene is detected, the face can be reliably focused on without being affected by the backlight by setting the face area (second face area) narrower than the detected face area (first face area) as the focus detection area. Furthermore, the automatic focus adjusting method can be realized without dedicated hardware, as the CPU 20 can realize the automatic focus adjusting method.

Second Embodiment

Figure 5:
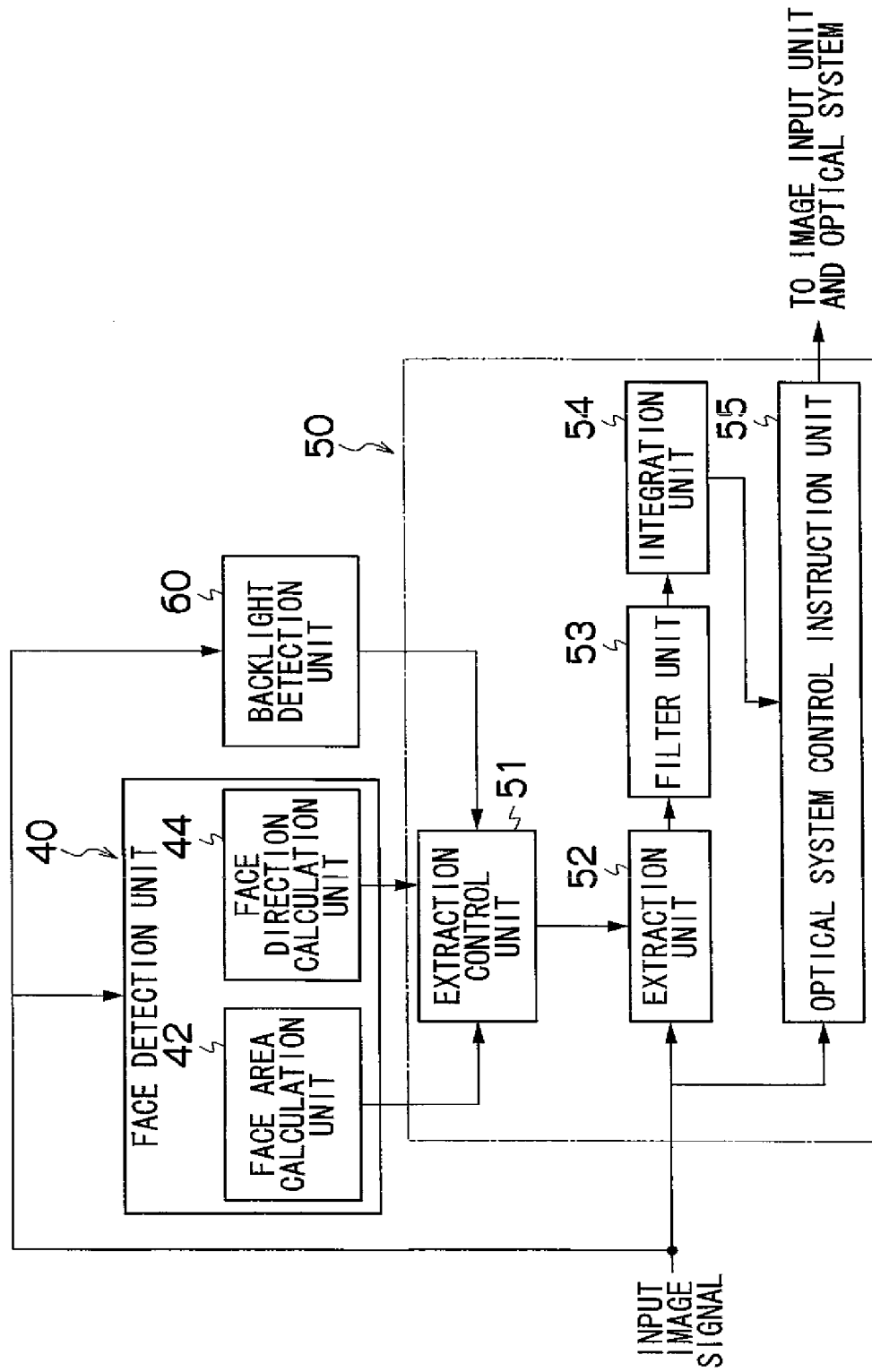
FIG. 5 is a block diagram showing a second embodiment of the focus adjusting unit.

FIG. 5 depicts a second embodiment of the focus adjusting unit 50. Like reference numerals refer to like elements in the first embodiment shown in FIG. 2 and will not be described in detail.

The face detection unit 40 shown in FIG. 5 comprises a face area calculation unit 42 and a face direction calculation unit 44.

The face area calculation unit 42 includes a face component extraction unit, analyzes an inputted image, extracts face components such as eyes, a nose, a mouth, and eye brows, and calculates a face area based on the coordinates of the extracted face components. The face area calculation unit 42 also extracts a boundary between the face and background based on high frequency components in the original image to detect a contour of the face and calculates the face area based on the coordinates of the face components or the coordinates of edge points of the contour of the face. The calculation method of the face area is not limited to the embodiment, and various methods may also be employed.

Figure 6:
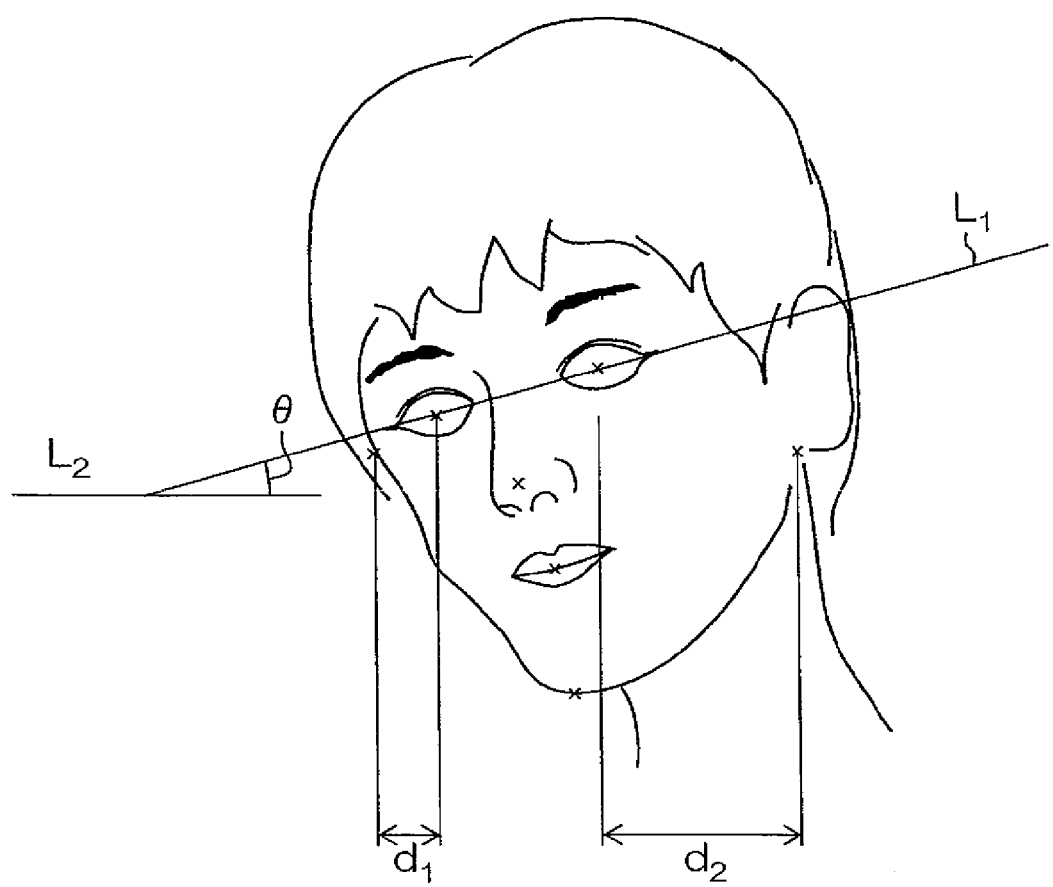
FIG. 6 is a view used for describing a method of detecting a direction of a face and the inclination of the face.

The face direction calculation unit 44 calculates a direction of the face and an inclination of the face based on coordinate information (coordinates) of the face components. For example, as shown in FIG. 6, the direction of the face can be calculated by finding distances d1 and d2 between the coordinates of the center of each eye and the coordinates of the edge points of the face contour and finding the difference between the left side and the right side of the face based on the distances d1 and d2. An inclination angle θ of the face can be detected by, for example, calculating the angle between a line L1 connecting the coordinates of the center of the left eye and the center of the right eye, and a horizontal reference line L2 of the screen.

The extraction control unit 51 sets a range to be extracted (focus detection area) based on the face area calculated by the face area calculation unit 42, the direction of the face calculated by the face direction calculation unit 44, and the backlight information from the backlight detection unit 60.

More specifically, the extraction control unit 51 sets the standard focus detection area when a face is not detected based on the information, and instructs the extraction unit 52 to extract image signals in the focus detection area. The extraction control unit 51 sets the face area (first face area) calculated by the face area calculation unit 42 as the focus detection area when the face is detected and the front-light scene is identified and instructs the extraction unit 52 to extract image signals in the focus detection area.

On the other hand, the extraction control unit 51 sets the face area (second face area), which is an reduced area of the first face area, as the focus detection area further in accordance with the direction of the face (for example, front, side, or diagonal) calculated by the face direction calculation unit 44 and instructs the extraction unit 52 to extract image signals in the focus detection area when the face is detected and the backlight scene is identified.

Figure 7A:
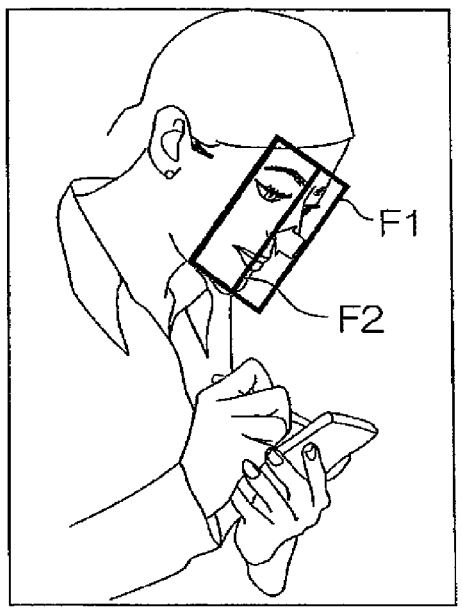
FIGS. 7A, 7B, and 7C are views used for describing a focus detection area when a direction of a face is not to the front.
Figure 7B:
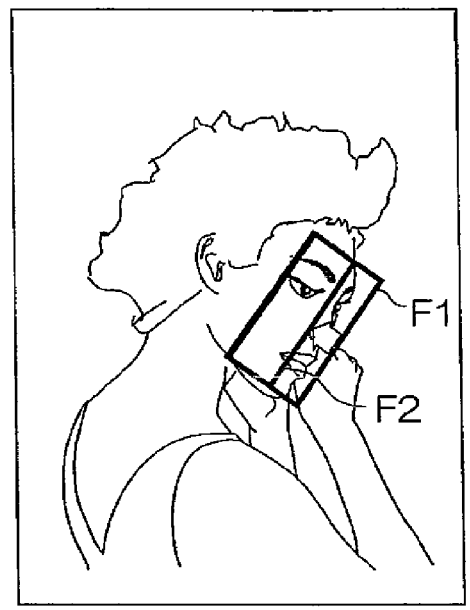
Figure 7C:
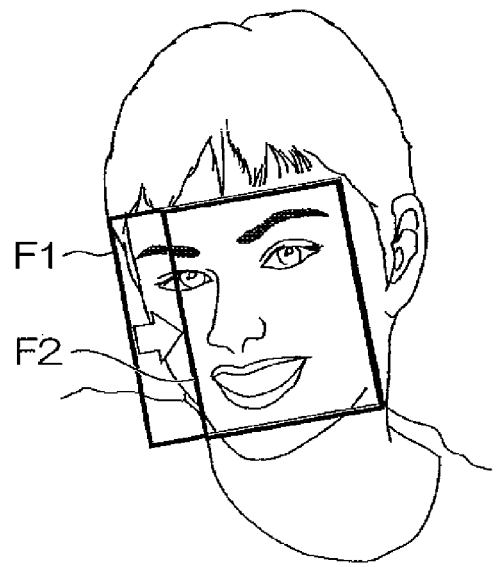

Specifically, when the direction of the face in the backlight is to the front, the face area (second face area) which is an area obtained by uniformly reducing the first face area as shown in FIG. 3 is set as the focus detection area. When the direction of the face in the backlight is to the side or diagonal, the area (second face area shown with frame border F2) which is obtained by reducing an area on the deeper side in the first face area (frame border F1) as shown in FIGS. 7A, 7B, and 7C is set as the focus detection area. In other words, when the direction of the face in the backlight is to the side or diagonal, the extraction control unit 51 trims an area of the face where the distance to the contour is shorter (deeper side) from the first face area on the basis of the direction of the face and sets the resultant first face area (second face area) as the focus detection area. This enables to exclude the contour of the face from the focus detection area.

In addition, the face area calculation unit 42 calculates the face area (first face area) depending on the direction of the face and the inclination of the face as shown in FIGS. 7A, 7B, and 7C.

A second embodiment of the automatic focus adjusting method according to the present invention will now be described with reference to a flow chart shown in FIG. 8. Like step numbers refer to like steps in the first embodiment shown in FIG. 4 and will not be described in detail.

Figure 8:
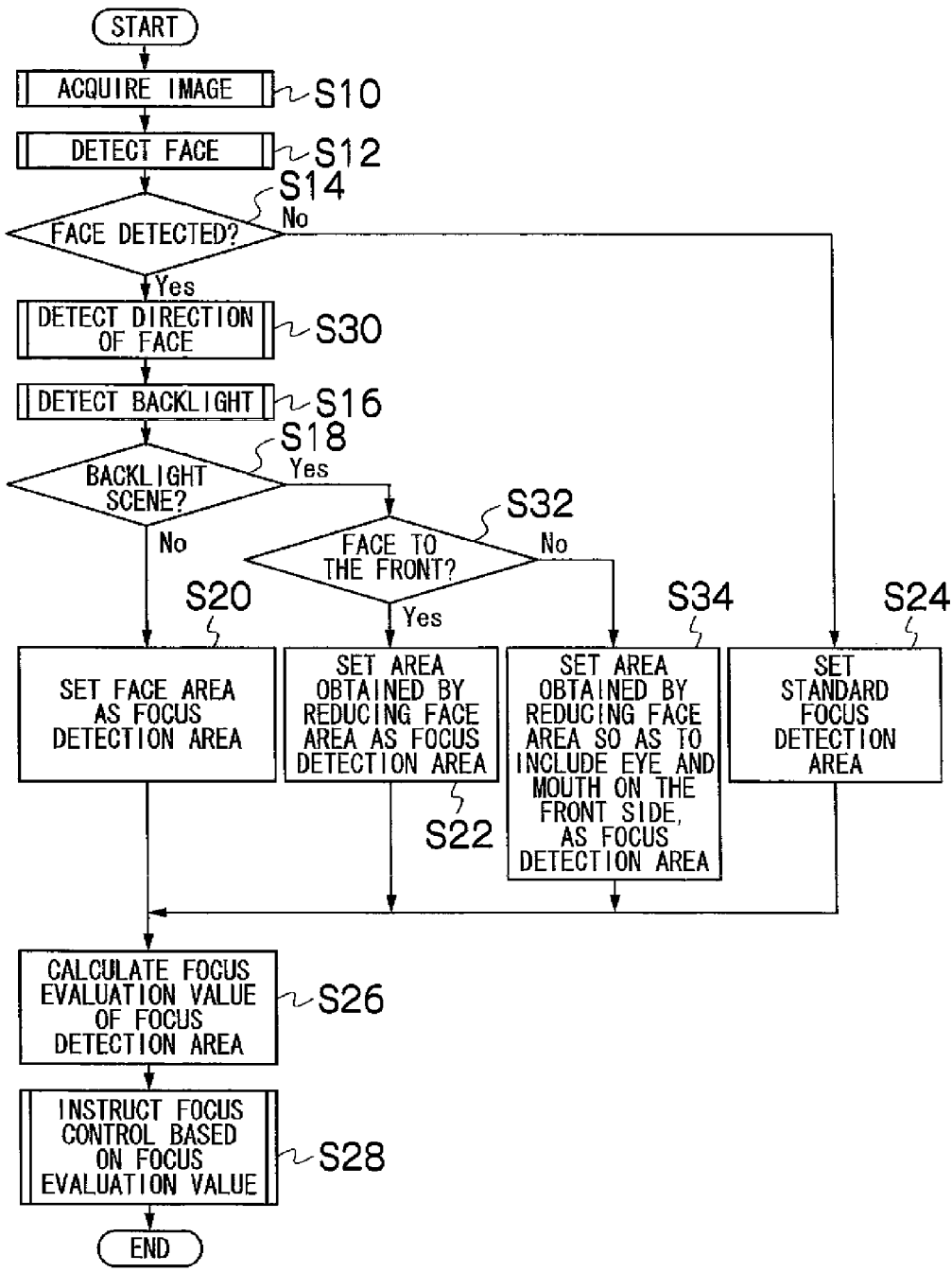
FIG. 8 is a flow chart showing a second embodiment of the automatic focus adjusting method according to the present invention.

In the second embodiment shown in FIG. 8, a process for detecting the direction of the face (step S30) and processes for changing the setting of the focus detection area in accordance with the direction of the face in the backlight (steps S32 and S34) are added.

More specifically, the face direction calculation unit 44 calculates the direction of the face in step S30. After the input image is determined to be a backlight scene in step S16, whether the direction of the face detected in step S30 is to the front is determined (step S32). When the direction of the face is determined to be to the front, the area (second face area shown with the frame border F2) obtained by reducing the first face area (frame border F1) as shown in FIG. 3 is set as the focus detection area (step S22).

On the other hand, when the direction of the face is determined not to the front (to the side or diagonal), the area (second face area shown with the frame border F2) obtained by reducing an area on the deeper side of the first face area (frame border F1) as shown in FIGS. 7A to 7C is set as the focus detection area.

In this way, the face can be reliably focused without being affected by the backlight by setting the face area (second face area) narrower than the detected face area (first face area) as the focus detection area when the backlight scene is detected. The area away from the area on the front side is selectively deleted when the direction of the face is not to the front, thereby enabling to delete the area that may cause focus error while leaving the area on which the focus is to be adjusted. Furthermore, the automatic focus adjusting method can be realized without dedicated hardware, as the CPU 20 can realize the automatic focus adjusting method.

In this embodiment, the second face area obtained by reducing an area on the deeper side from the first face area is set as the focus detection area when the direction of the face is determined to be to the side or diagonal. However, the reduction ratios of the area on the deeper side of the face and the area on the front side may be varied, or the reduction ratios may be changed in accordance with the angle of the face to the front.

Third Embodiment

Figure 9:
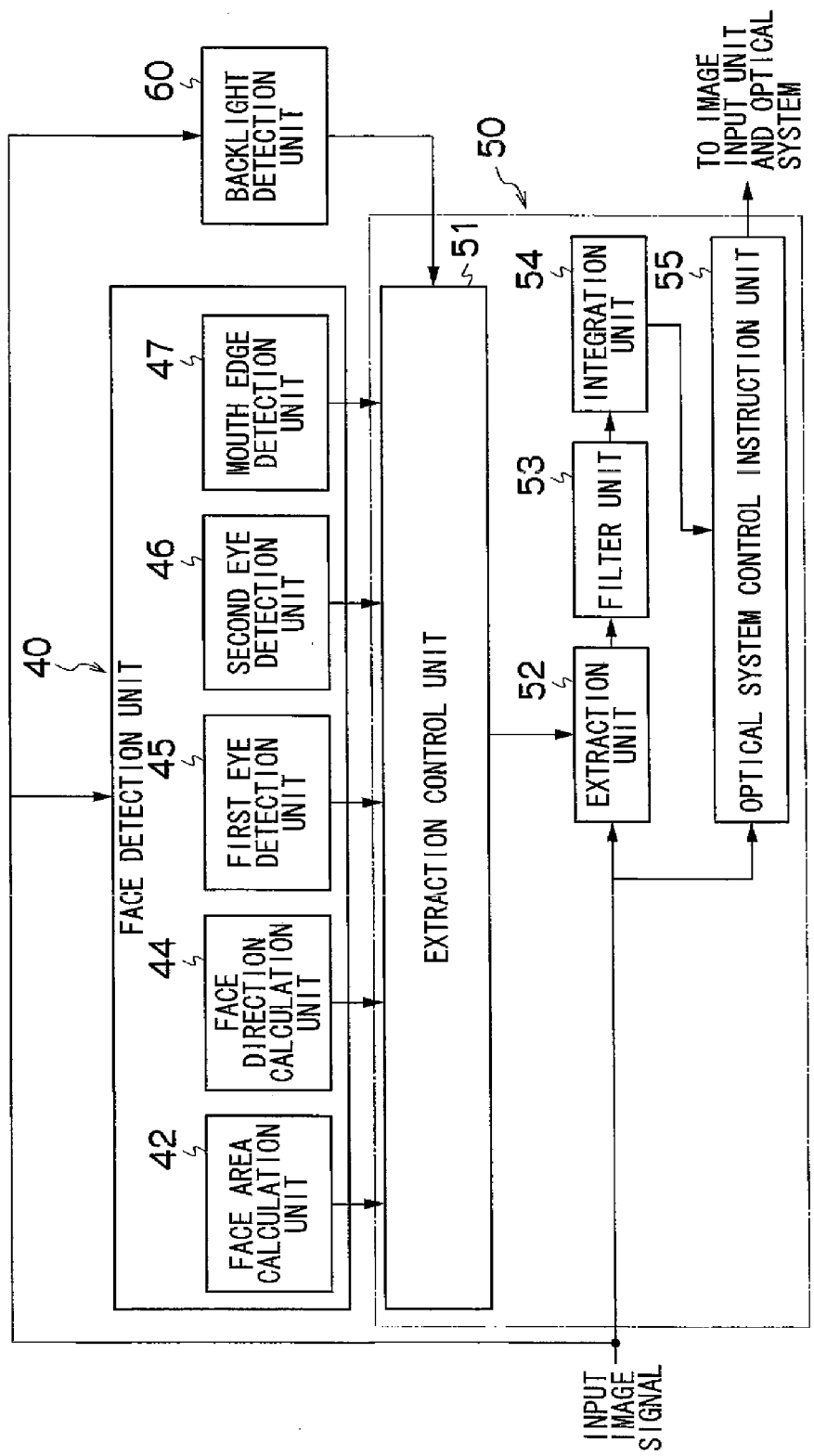
FIG. 9 is a block diagram showing a third embodiment of the focus adjusting unit.

FIG. 9 depicts a third embodiment of the focus adjusting unit 50. Like reference numerals refer to like elements in the second embodiment shown in FIG. 5 and will not be described in detail.

As shown in FIG. 9, the face detection unit 40 further includes a first eye detection unit 45, a second eye detection unit 46, and a mouth edge detection unit 47 in addition to the face area calculation unit 42 and the face direction calculation unit 44 shown in FIG. 5.

The first eye detection unit 45 detects the right eye from the face area, while the second eye detection unit 46 detects the left eye from the face area, and the mouth edge detection unit 47 detects both edges of the mouth, including the mouth, from the face area. If the first eye detection unit 45, the second eye detection unit 46, and the mouth edge detection unit 47 are originally included as face component detection units in the face area calculation unit 42, these face component detection units can be utilized.

The extraction control unit 51 sets a range to be extracted (focus detection area) based on the face area calculated by the face area calculation unit 42, the direction of the face calculated by the face direction calculation unit 44, the positions of the left and right eyes detected by the first eye detection unit 45 and the second eye detection unit 46, the positions of both edges of the mouth detected by the mouth edge detection unit 47, and the backlight information from the backlight detection unit 60.

More specifically, the extraction control unit 51 sets the standard focus detection area when a face is not detected based on the information and instructs the extraction unit 52 to extract image signals in the focus detection area. The extraction control unit 51 sets the face area (first face area) calculated by the face area calculation unit 42 as the focus detection area when the face is detected and the front-light scene is identified and instructs the extraction unit 52 to extract image signals in the focus detection area.

On the other hand, the extraction control unit 51 sets the face area (second face area) which is obtained by reducing the first face area further depending on the direction of the face (for example, front, side, or diagonal) calculated by the face direction calculation unit 44, as the focus detection area when the face is detected and the backlight scene is identified. The extraction control unit 51 then instructs the extraction unit 52 to extract image signals in the focus detection area.

More specifically, the extraction control unit 51 sets the face area (second face area) which is obtained by uniformly reducing the first face area as shown in FIG. 3, as the focus detection area when the direction of the face is to the front in the backlight. The extraction control unit 51 sets the area including the eye on the front side as the focus detection area further based on the positions of the left and right eyes detected by the first eye detection unit 45 and the second eye detection unit 46 and the positions of both edges of the mouth detected by the mouth edge detection unit 47, when the direction of the face is not to the front (when the face is tilted for about 15 degrees or more from the front-face position in the horizontal direction (vertical direction is not in question)) in the backlight. In this case, when mouth is successfully detected, the area including the eye on the front side and the mouth edge on the front side is preferably set.

Figure 10A:
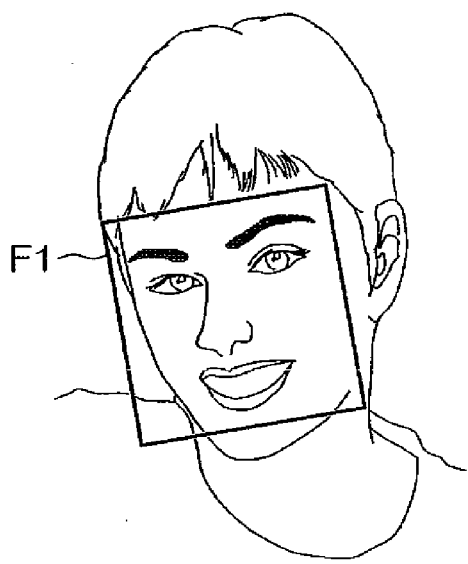
FIGS. 10A and 10B are views used for describing another example of the focus detection area when the direction of the face is not to the front.
Figure 10B:
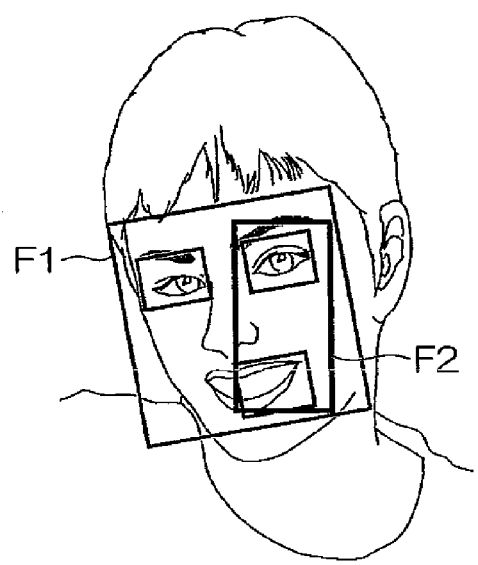
Figure 11A:
FIGS. 11A and 11B are views used for describing another example of the focus detection area when the direction of the face is not to the front.
Figure 11B:
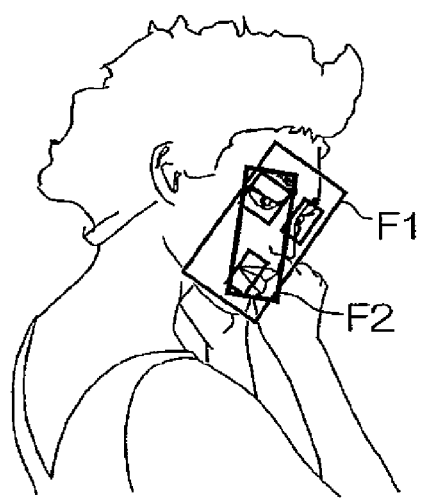

Each of FIGS. 10A and 11A depicts the first face area (frame border F1) when the front-light scene is identified, while each of FIGS. 10B and 11B depicts the second face area (frame border F2) including the eye on the front side and the mouth edge on the front side when the backlight scene is identified. When the front-light scene is identified, the first face area is set as the focus detection area. On the other hand, when the backlight scene is identified, the second face area is set as the focus detection area.

A third embodiment of the automatic focus adjusting method according to the present invention will now be described with reference to a flow chart shown in FIG. 12. Like step numbers refer to like steps in the second embodiment shown in FIG. 8 and will not be described in detail.

Figure 12:
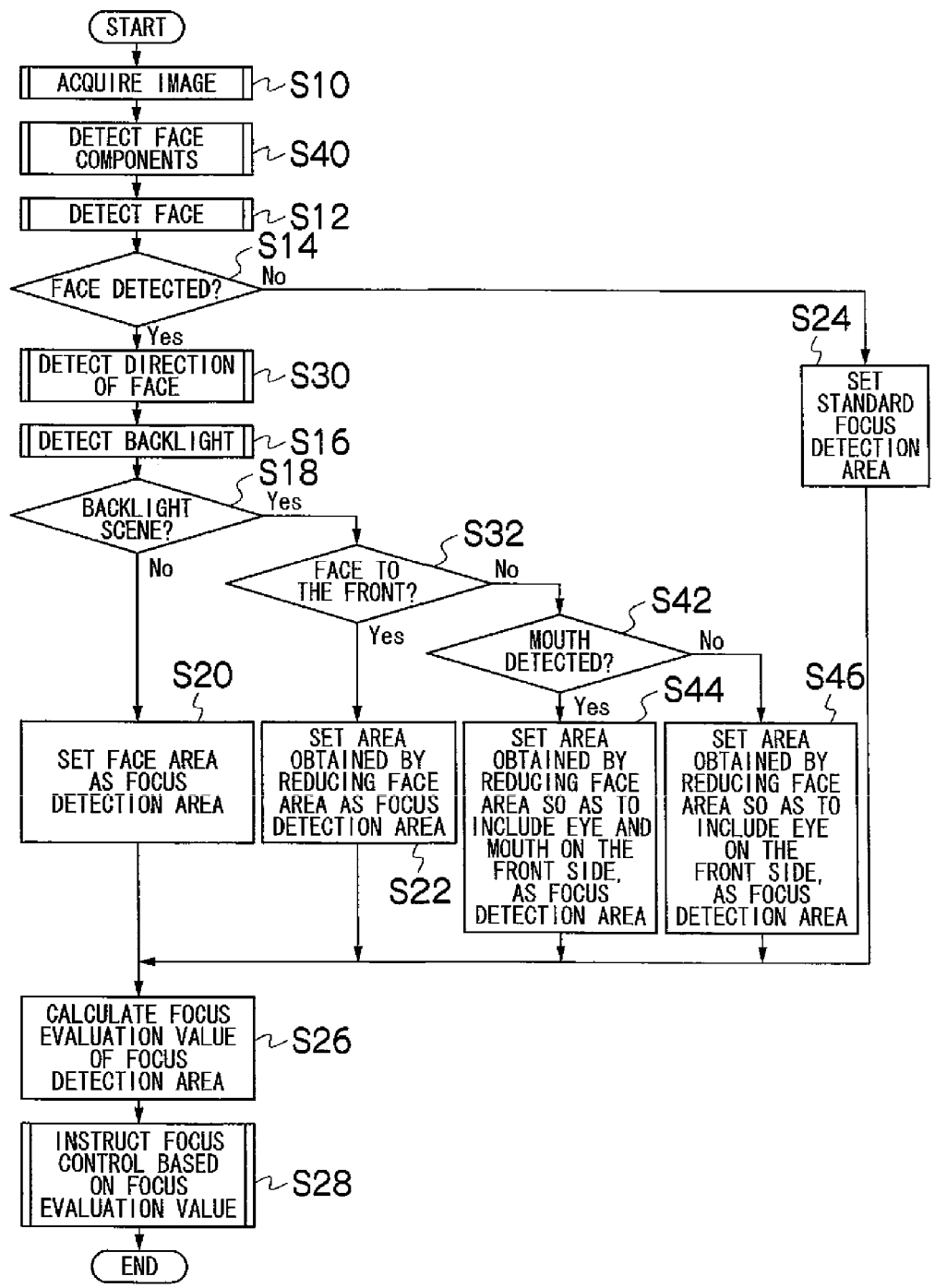
FIG. 12 is a flow chart showing a third embodiment of the automatic focus adjusting method according to the present invention.

A process for detecting face components such as eyes and mouth (step S40) and a process for changing the setting of the focus detection area in accordance with the direction of the face and the positions of the face components when the face is not to the front in the backlight (steps S42, S44, and S46) are added in the third embodiment shown in FIG. 12.

In step S40, the first eye detection unit 45, the second eye detection unit 46, and the mouth edge detection unit 47 detect the positions of both eyes and the positions of both edges of the mouth. In step S16, if the input image is determined to be a backlight scene, whether the direction of the face detected in step S30 is to the front is determined (step S32). When the direction of the face is determined to be to the front, the second face area (frame border F2) obtained by reducing the first face area (frame border F1) as shown in FIG. 3 is set as the focus detection area (step S22).

Meanwhile, when the direction of the face is determined not to the front, whether both edges of the mouth are detected in step S40 is determined (step S42).

When both edges of the mouth are detected, the area (second face area shown with the frame border F2) including the eye on the front side and the mouth edge on the front side as shown in FIGS. 10B and 11B is set as the focus detection area (step S44). When both edges of the mouth are not detected, the area (second face area) including the eye on the front side is set as the focus detection area (step S46).

In this way, when the backlight scene is detected, setting of the face area (second face area) narrower than the detected face area (first face area) as the focus detection area enables to reliably focus the face without being affected by the backlight. When the direction of the face is not to the front, selective deletion of the area away from the area on the front side enables to delete the area that may cause focus error while leaving the area whose focus is to be adjusted. Additionally, more appropriate focus adjustment can be performed because the eye on the front side, as well as the mouth edge on the front side if detected, can be focused. Furthermore, the automatic focus adjusting method can be realized without dedicated hardware, as the CPU 20 can realize the automatic focus adjusting method.

Fourth Embodiment

Figure 13:
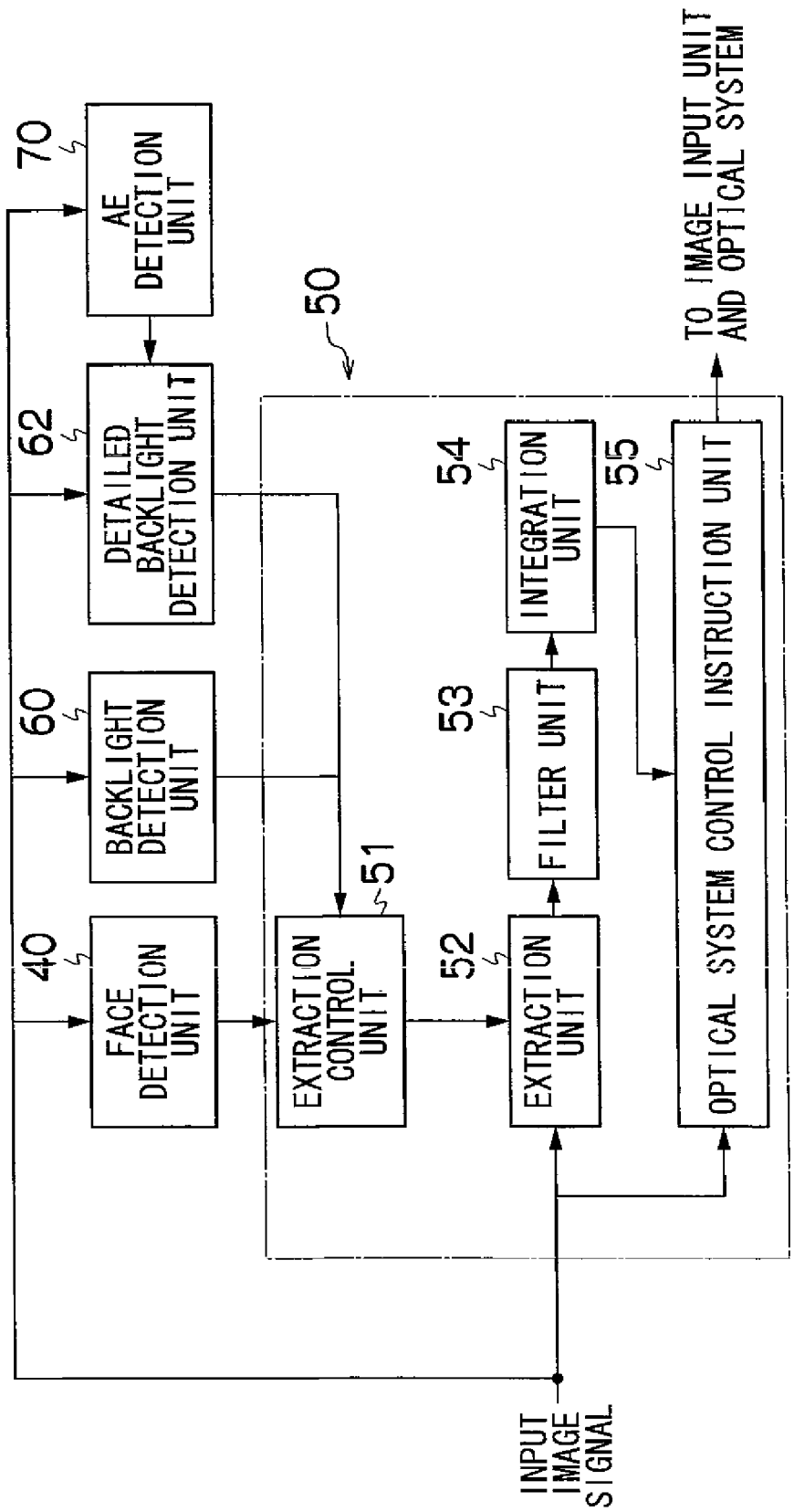
FIG. 13 is a block diagram showing a fourth embodiment of the focus adjusting unit.

FIG. 13 depicts a fourth embodiment of the focus adjusting unit 50. Like reference numerals refer to like elements in the first embodiment shown in FIG. 2 and will not be described in detail.

Information of the face area from the face detection unit 40, backlight information from the backlight detection unit 60, and detailed backlight information from the detailed backlight detection unit 62 are inputted to the extraction control unit S1 shown in FIG. 13.

Figure 14:
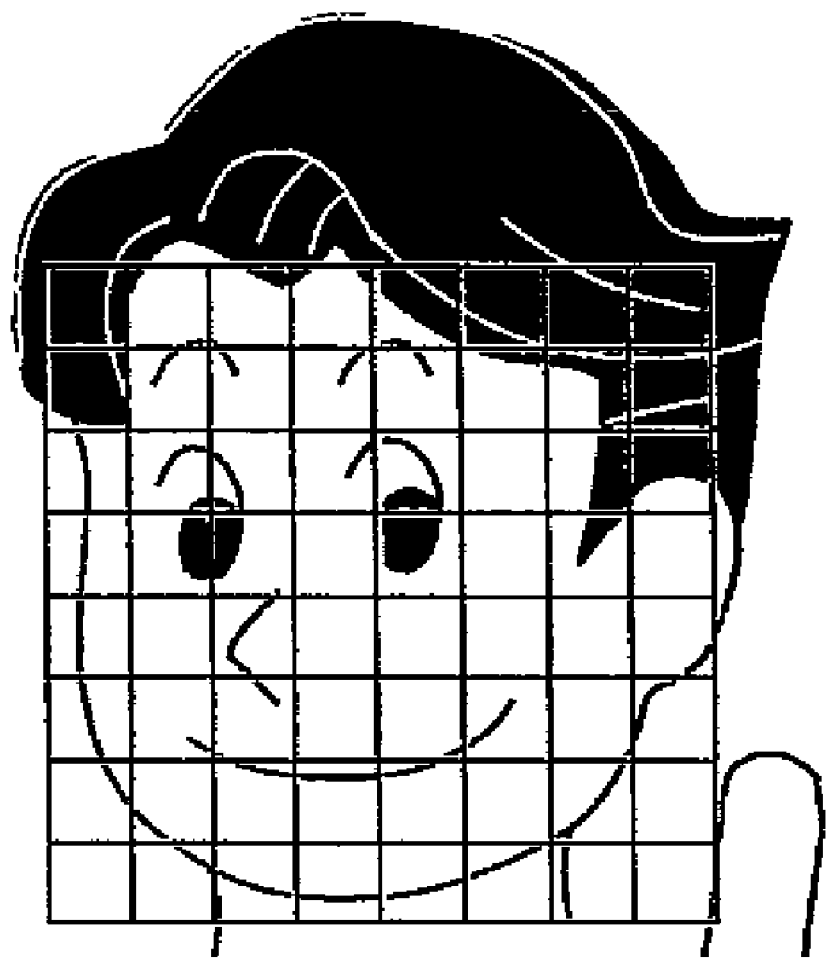
FIG. 14 is a view used for describing processes by a detailed backlight detection unit.

The detailed backlight detection unit 62 determines whether a backlight part exists in the face area detected by the face detection unit 40 based on information from an AE detection unit 70. More specifically, as shown in FIG. 14, the detailed backlight detection unit 62 divides the face area detected by the face detection unit 40 into, for example, 64 AE blocks (eight by eight) and acquires information of the brightness of each AE block from the AE detection unit 70. The detailed backlight detection unit 62 then determines whether the backlight (detailed backlight) in the face area exists outside the contour of the face in the face area based on the conditions, such as, an AE block which is brighter than the contour of the face by 5 EV or more. However, the detailed backlight detection unit 62 is not the main point of the present invention, and other methods can also be used.

The extraction control unit 51 sets the standard focus detection area (predetermined area at the center of the screen) when a face is not detected based on the information from the face detection unit 40, the backlight detection unit 60 and the detailed backlight detection unit 62, and instructs the extraction unit 52 to extract image signals in the focus detection area. The extraction control unit 51 sets the face area (first face area) including the face detected by the face detection unit 40 as the focus detection area when the face is detected and the front-light scene is identified, or when there is no backlight part in the face area even if the image is determined to be a backlight scene, and instructs the extraction unit 52 to extract image signals in the focus detection area.

On the other hand, the extraction control unit 51 sets the face area (second face area) which is obtained by reducing the first face area, as the focus detection area when the face is detected, the image is determined to be a backlight scene, and a backlight part exists in the face area. The extraction control unit 51 then instructs the extraction unit 52 to extract image signals in the focus detection area.

A fourth embodiment of the automatic focus adjusting method according to the present invention will now be described with reference to a flow chart shown in FIG. 15. Like step numbers refer to like steps in the first embodiment shown in FIG. 4 and will not be described in detail.

Figure 15:
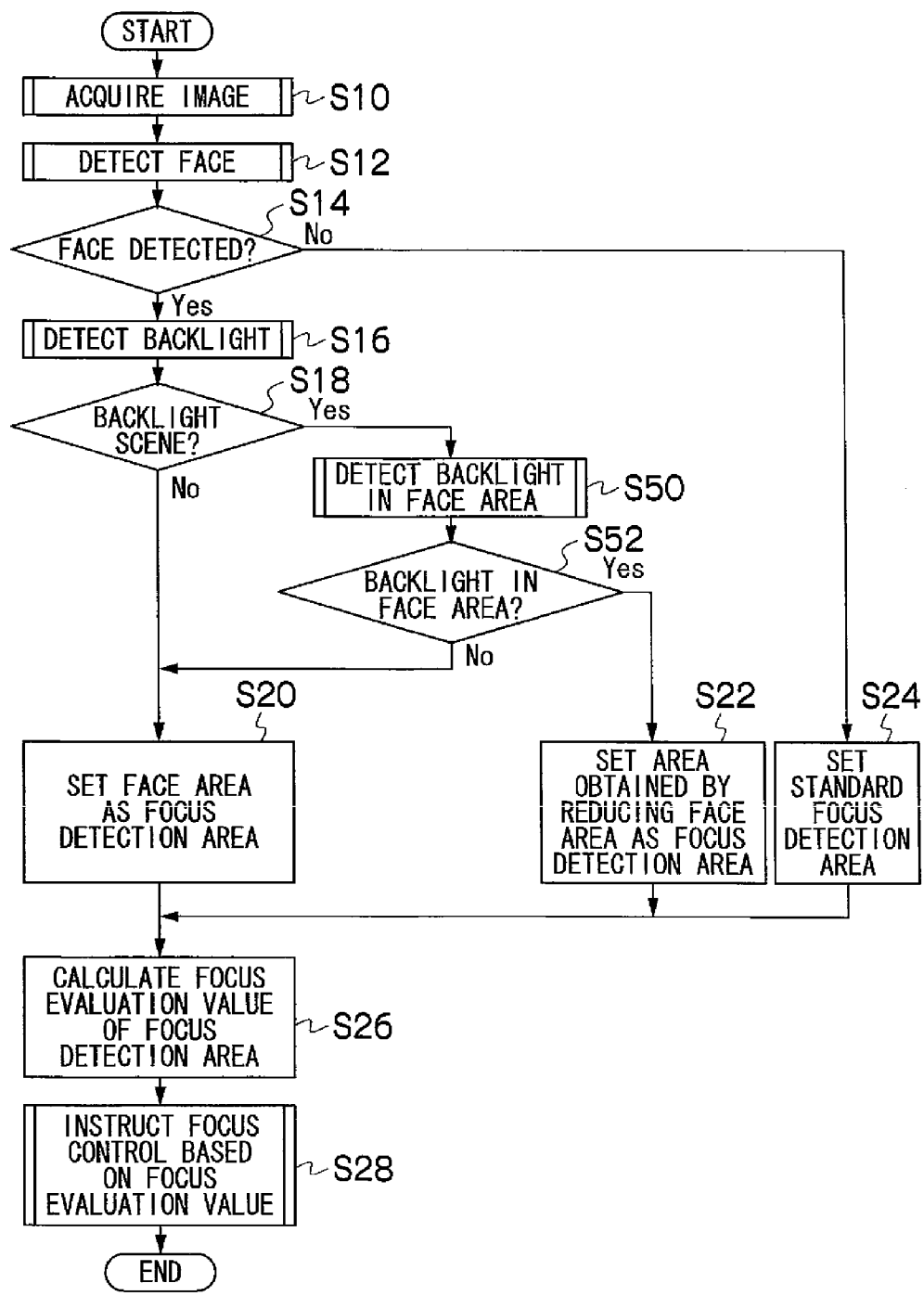
FIG. 15 is a flow chart showing a fourth embodiment of the automatic focus adjusting method according to the present invention.
Figure 16:
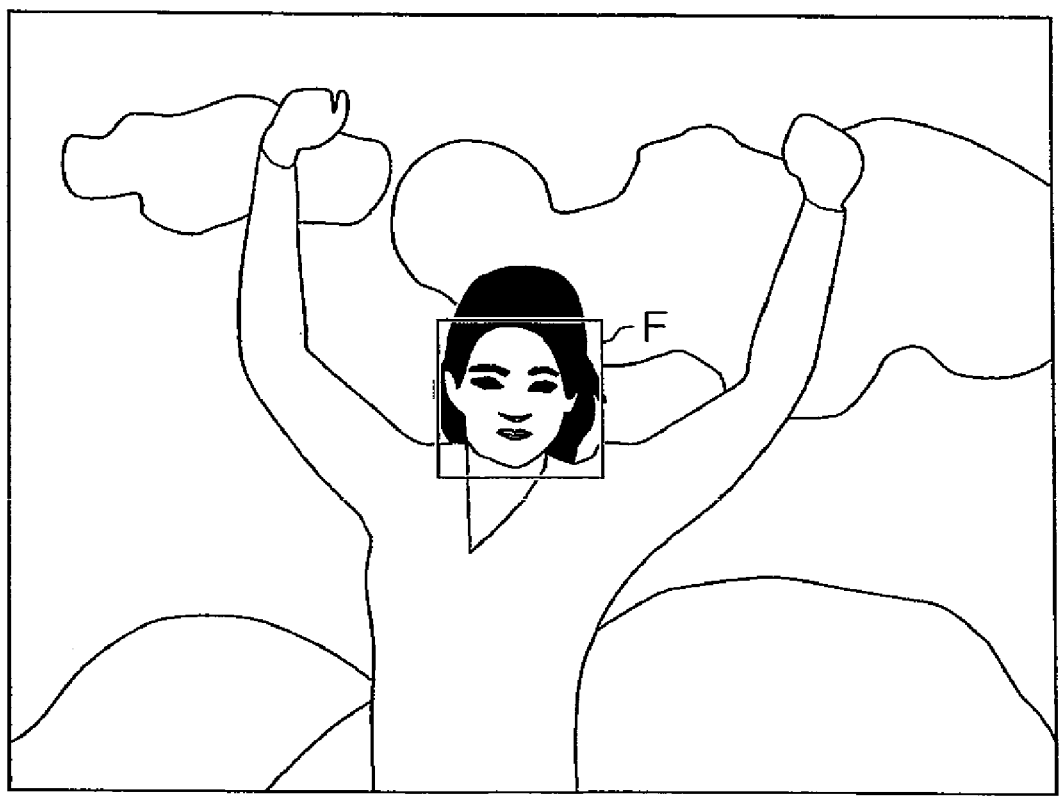
FIG. 16 is a view used for describing a related method for setting a face area as a focus detection area.
Figure 17:
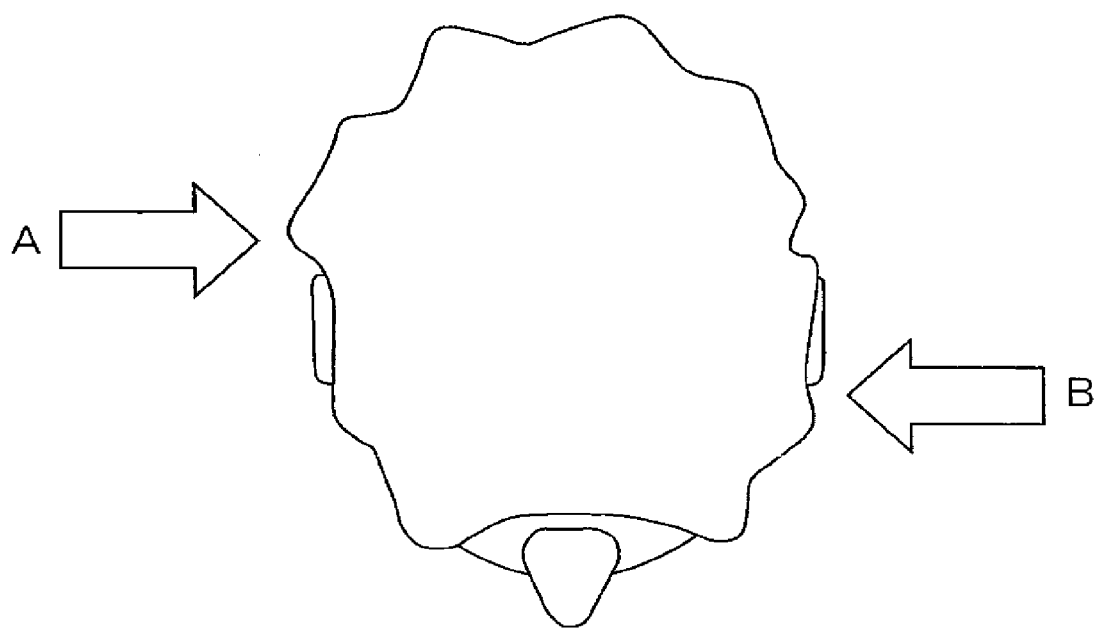
FIG. 17 is a view used for describing a conventional problem when the face area is set as the focus detection area.

In the fourth embodiment shown in FIG. 15, a process for detecting the backlight in the detected face area (step S40) and a process for changing the setting of the focus detection area depending on the existence of the backlight part in the face area (step S52) are added.

Specifically, in step S50, the detailed backlight detection unit 62 detects whether there is a backlight part in the face area. In step S52, when it is determined that a backlight part does not exist in the face area, the process shifts to step S20, and the detected face area (first face area) is set as the focus detection area in the same way as the front-light scene.

On the other hand, the process shifts to step S22 when it is further determined that the backlight part exists in the face area in the backlight scene, and instead of the detected face area (first face area), the face area (second face area) which is obtained by the first face area is set as the focus detection area (step S22). The reduction method of the face area is not limited to the method in the first embodiment.

In this way, the face can be reliably focused on without being affected by backlight by setting the face area (second face area) narrower than the detected face area (first face area) as the focus detection area when a backlight scene is detected. Especially, when there is no backlight part in the face area, the focus is adjusted using information in the detected face area (focus detection area), and when there is a backlight part in the face area, the focus is adjusted using information in an area which is obtained by narrowing down the focus detection area. Thereby, more reliable focus adjustment using the face area can be performed. Furthermore, the automatic focus adjusting method can be realized without dedicated hardware, as the CPU 20 can realize the automatic focus adjusting method.

Other Embodiments

The reduction method for reducing the face area (focus detection area) in the case of a backlight scene is not limited to the embodiments. When detecting a contour of the face, the focus detection area may be set using contour information of the face so that the focus detection area falls within the contour of the face.

Although the face area and the focus detection area are set in rectangle shapes in the embodiments, the face area and the focus detection area may be set in other forms such as oval shapes.

Further, it should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An automatic focus adjusting apparatus which adjusts a focus based on image signals in a preset focus detection area, the automatic focus adjusting apparatus comprising:
   an image acquisition device which acquires an image;
   a face detection device which detects a face from the image acquired by the image acquisition device;

a backlight detection device which detects backlight based on the image acquired by the image acquisition device; and a focus detection area setting device which sets, when the face is detected by the face detection device, a first face area including the face detected by the face detection device as a focus detection area if backlight is not detected by the backlight detection device and a second face area in the first face area narrower than the first face area as the focus detection area if backlight is detected by the backlight detection device, wherein the face detection device includes a contour detection device which detects a contour of the face, and the focus detection area setting device calculates the second face area so that the second face area falls within the contour of the face detected by the contour detection device when calculating the second face area in the first face area narrower than the first face area after the backlight is detected by the backlight detection device.

2. The automatic focus adjusting apparatus according to claim 1, wherein the face detection device includes a face direction detection device which detects a direction of the face, and the focus detection area setting device calculates the second face area by reducing larger on the deeper side of the first face area than on the front side, depending on the direction of the face detected by the face direction detection device when calculating the second face area in the first face area narrower than the first face area after the backlight is detected by the backlight detection device.

3. The automatic focus adjusting apparatus according to claim 1, wherein the face detection device includes:

a face component detection device which detects face components including eyes; and a face direction detection device which detects a direction of the face, and the focus detection area setting device identifies an eye on the front side of the eyes detected by the face component detection device depending on the direction of the face detected by the face direction detection device and calculates the second face area obtained by reducing the first face area so as to include the identified eye on the front side, when calculating the second face area in the first face area narrower than the first face area after the backlight is detected by the backlight detection device.

4. The automatic focus adjusting apparatus according to claim 1, wherein the face detection device includes:

a face component detection device which detects face components including eyes and a mouth; and a face direction detection device which detects a direction of the face, and the focus detection area setting device identifies an eye and an edge of the mouth on the front side of the eyes and edges of the mouth detected by the face component detection device depending on the direction of the face detected by the face direction detection device and calculates the second face area obtained by reducing the first face area so as to include the identified eye on the front side and the edge of the mouth on the front side, when calculating the second face area in the first face area narrower than the first face area after the backlight is detected by the backlight detection device.

5. The automatic focus adjusting apparatus according to claim 1, wherein the backlight detection device includes:

a first backlight detection device which detects backlight based on the entire image acquired by the image acquisition device; and a second backlight detection device which detects backlight based on an image in the first face area including the face detected by the face detection device, and when the face is detected by the face detection device, the first face area including the face detected by the face detection device is set as the focus detection area if backlight is not detected by the first backlight detection device or the second backlight detection device, and the second face area obtained by reducing the first face area is set as the focus detection area if backlight is detected by the first backlight detection device and the second backlight detection device.

6. An image pickup apparatus comprising:

the automatic focus adjusting apparatus according to claim 1;

an image pickup device which picks up the image in which the focus is adjusted by the automatic focus adjusting apparatus; and a recording device which records the picked up image on a recording medium.

7. An automatic focus adjusting method comprising:

an image acquisition step of acquiring an image;

a face detection step of detecting a face from the acquired image;

a backlight detection step of detecting backlight based on the acquired image;

a focus detection area setting step of, when the face is detected in the face detection step, setting a first face area including the detected face as a focus detection area when backlight is not detected in the backlight detection step and setting a second face area in the first face area narrower than the first face area including the detected face as the focus detection area when backlight is detected; and a step of adjusting a focus based on image signals in the focus detection area set in the focus detection area setting step, wherein the face detection step includes a contour detection step of detecting a contour of the face, and in the focus detection area setting step, the second face area is calculated so that the second face area falls within the contour of the face detected in the contour detection step when calculating the second face area in the first face area narrower than the first face area after the backlight is detected in the backlight detection step.

8. The automatic focus adjusting method according to claim 7, wherein the face detection step includes:

a face direction detection step of detecting a direction of the face, and in the focus detection area setting step, the second face area is calculated by reducing larger on the deeper side of the first face area than on the front side, depending on the direction of the face detected in the face direction detection step when calculating the second face area in the first face area narrower than the first face area after the backlight is detected in the backlight detection step.

9. The automatic focus adjusting method according to claim 7, wherein the face detection step includes:

a face component detection step of detecting face components including eyes; and a face direction detection step of detecting a direction of the face, and in the focus detection area setting step, an eye on the front side of the eyes detected by the face component detection step is identified depending on the direction of the face detected in the face direction detection step and the second face area is calculated by reducing the first face area so as to include the identified eye on the front side, when calculating the second face area in the first face area narrower than the first face area after the backlight is detected in the backlight detection step.

10. The automatic focus adjusting method according to claim 7, wherein the face detection step includes:

a face component detection step of detecting face components including eyes and a mouth; and a face direction detection step of detecting a direction of the face, and in the focus detection area setting step, an eye on the front side of the eyes detected in the face component detection step and an edge of the mouth on the front side are identified depending on the direction of the face detected in the face direction detection step and the second face area is calculated by reducing the first face area so as to include the identified eye on the front side and the edge of the mouth on the front side, when calculating the second face area in the first face area narrower than the first face area after the backlight is detected in the backlight detection step.

11. The automatic focus adjusting method according to claim 7, wherein the backlight detection step includes:

a first backlight detection step of detecting backlight based on the entire image acquired in the image acquisition step; and a second backlight detection step of detecting backlight based on the image in the first face area including the face detected in the face detection step, and when a face is detected in the face detection step, the first face area including the face detected in the face detection step is set as the focus detection area if backlight is not detected in the first backlight detection step or the second backlight detection step, and the second face area obtained by reducing the first face area is set as the focus detection area if backlight is detected in the first backlight detection step and the second backlight detecting step.

12. An image pickup method comprising:

an image pickup step of picking up the image in which the focus is adjusted by the automatic focus adjusting method according to claim 7; and a recording step of recording the picked up image on a recording medium.

\* \* \* \* \*